May 31, 1949.  P. E. VOLZ  2,471,916
MOTOR SPEED CONTROL
Filed March 19, 1947  2 Sheets-Sheet 2

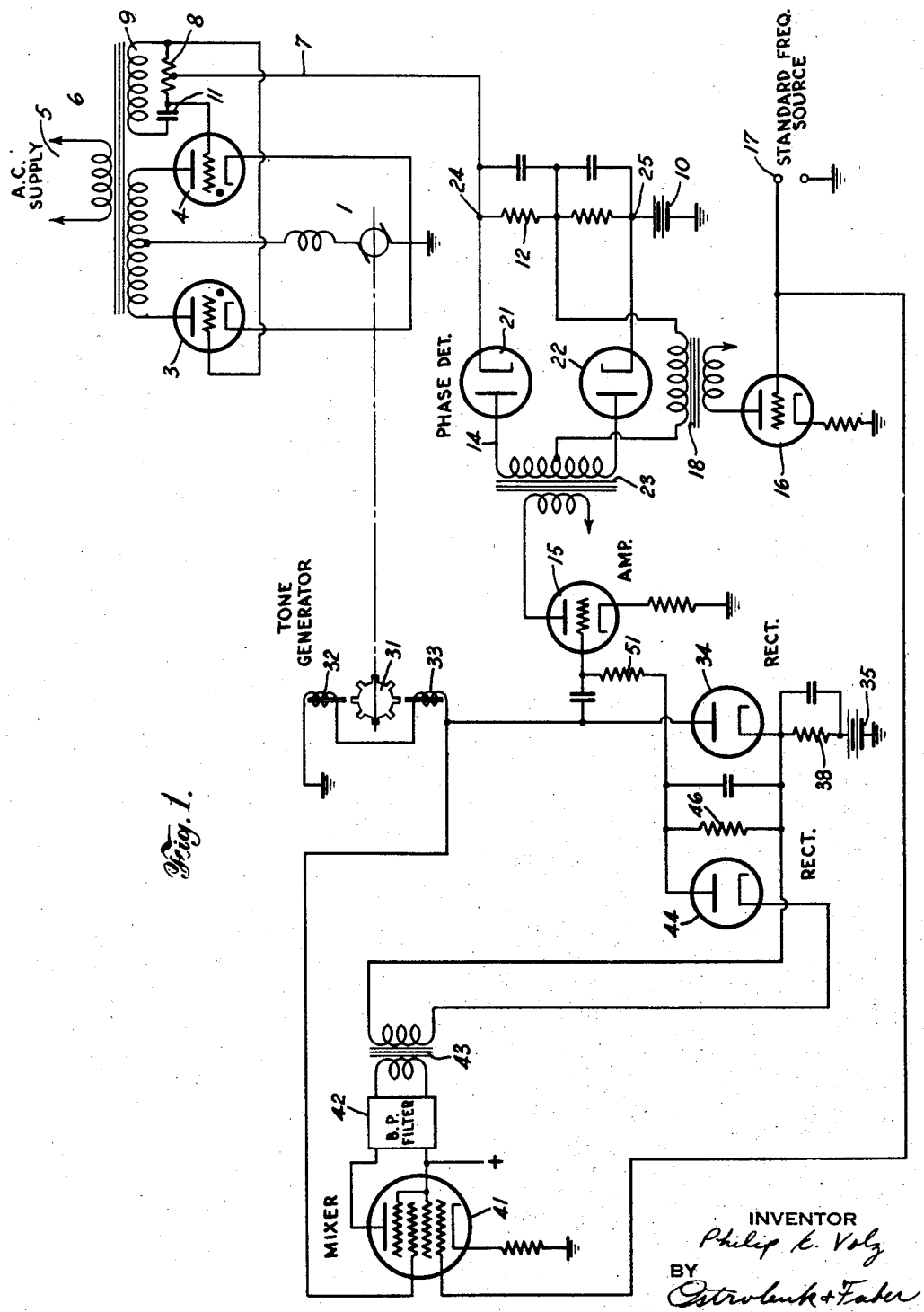

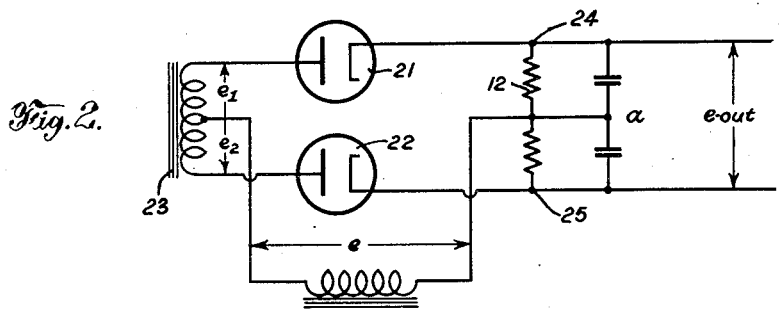

Fig. 2.

$e_{21}$ — VOLTAGE APPLIED BETWEEN POINT $\alpha$ AND DIODE 21 PLATE
$e_{22}$ — VOLTAGE APPLIED BETWEEN POINT $\alpha$ AND DIODE 22 PLATE

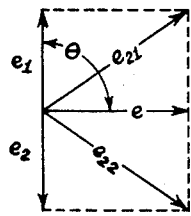

Fig. 3.

CONDITION FOR 90°
BETWEEN $e_1$ AND $e$ $e_{21} = e_{22}$

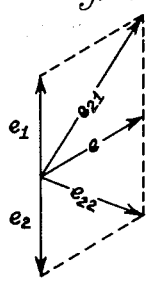

Fig. 4.

CONDITION FOR 45°
BETWEEN $e_1$ AND $e$ $e_{21} > e_{22}$

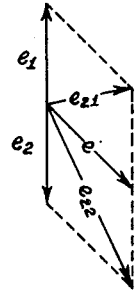

Fig. 5.

CONDITION FOR 45°
BETWEEN $e_2$ AND $e$ $e_{21} < e_{22}$

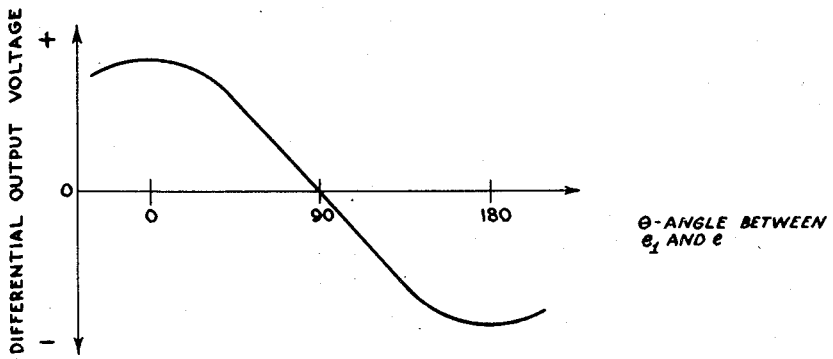

Fig. 6.

$\theta$ — ANGLE BETWEEN $e_1$ AND $e$

INVENTOR
Philip E. Volz
BY
Ostrolenk and Faber
ATTORNEYS

Patented May 31, 1949

2,471,916

UNITED STATES PATENT OFFICE 2,471,916

MOTOR SPEED CONTROL

Philip E. Volz, Orange, N. J., assignor to Finch Telecommunications, Inc., Passaic, N. J., a corporation of Delaware Application March 19, 1947, Serial No. 735,752

8 Claims. (Cl. 318—345)

My invention relates to a motor speed control, and more particularly relates to a novel electronically operated motor speed control system.

In signalling systems such as in facsimile, it is essential to maintain synchronism between rotating members remotely disposed with respect to each other. Heretofore, this has involved complex mechanical mechanism such as tuning forks which are both costly and heavy.

In accordance with my invention, I provide a novel electronic means which measures the fluctuation in the driving motor from a predetermined speed to in turn control the application of power to the motor.

Essentially, I generate a frequency which is a function of the speed of the motor to be controlled. I then compare the phase of this frequency with the phase of a standard frequency. The phase difference is therefore used to control the firing of a gas tube which in turn controls the power supply to the motor to thus maintain it at synchronous speed.

Accordingly an object of my invention is to provide a novel phase detector circuit for comparing the speed of a motor with a frequency standard for maintaining a motor at a predetermined synchronous speed.

A further object of my invention is to provide a novel gas tube operation for controlling the application of power to a motor for maintaining it at a predetermined speed.

Still a further object of my invention is to provide a novel phase detector circuit for controlling the firing of gas tubes in accordance with fluctuations in speed fluctuations of a motor from a predetermined speed in turn supply driving power to a motor whose speed is to be controlled.

These and other objects of my invention will be clear from the detailed description and the drawings in which Figure 1 is a circuit diagram of one form of my invention.

Figure 2 is a circuit diagram of a portion of Figure 1 showing the phase detector with voltages applied.

Figures 3, 4 and 5 are vector diagrams showing conditions obtained with various phase relationships between the voltages; and Figure 6 is a curve between the voltage output and phase angles.

Referring to Figure 1, a motor 1, which is to be driven at a predetermined speed, is fed by energy supplied from the two gas triodes 3 and 4. The plates of the gas triodes 3 and 4 are fed push-pull from a power supply 5 connected to the primary of a transformer 6, the secondaries of which are connected to the plates of the tubes 3 and 4.

The grids of the tubes 3 and 4 are biased by battery 10 over circuits including the conductor 7 and in parallel over resistor 8 to each of the grids. The condenser 11 and the resistor 8 are of such value to make the alternating current supply voltages fed to the grids and plates of tubes 3 and 4 essentially 90° out of phase. Normally the bias applied to the grids of gas tubes 3 and 4 by the battery 10 over the load resistors 11 and 12 is such as to fire the tubes 3 and 4 at a predetermined point in each cycle so as to maintain the motor 1 rotating at a predetermined speed.

As will be described, the phase detector 14 controls the bias potential applied to the grids of tubes 3 and 4 in accordance with the phase differential existing between the amplifier tubes 15 and 16, which phase differential in turn indicates the speed variation of the motor 1 from a predetermined speed.

The grid of amplifier tube 16 is connected to a standard frequency source 17. The output of the amplifier tube 16 is connected through the transformer 18 to the anodes of the diodes 21 and 22 of the phase detector 14 through the mid-point of the secondary of transformer 23.

In the absence of any other signal as from amplifier 15, the current flowing in the diodes 21 and 22 through resistances 12 and 11 is in such opposed phase relation that zero voltage obtains between the opposite terminals 24 and 25 of load resistors 11 and 12. This voltage relation, however, is changed in accordance with the output of amplifier tube 15 in a manner now to be described.

Referring again to the motor 1, this motor is connected either directly or through gearing to a tone generator 31. The output voltage induced in the windings 32 and 33 is impressed on the anode of the diode rectifier tube 34. With the generator 31 rotating substantially below normal speed, the grid of the amplifier tube 15 is normally biased to cut-off by the battery 35 over a circuit including resistors 38, 46 and 51.

When the generator 31 is up to approximately correct speed, the bias on the amplifier tube 15 is no longer at cut-off. The output of the amplifier tube 15 flowing through the primary to transformer 23 now adds or subtracts from the output from the standard frequency source 17 applied to the secondary of transformer 23 as described above. So long as the predetermined phase relationship exists, the net effect of the two voltages is such that the bias on the gas triodes 3 and 4 produces a resultant output to drive motor 1 at a predetermined speed.

Assuming, for example, that a 45° phase difference between the output signal of amplifier 15 and of the standard frequency provides the above described condition, then in that case the signal through the diode 21 will be increased by the signal from the amplifier 15 and the current flowing through the diode 22 will be correspondingly decreased producing a resultant potential difference between 24 and 25, which in turn produces the desired bias on the tubes 3 and 4 at which the power supply to motor 1 maintains it at its predetermined speed.

Assuming, for example, motor 1 is rotating at 900 R. P. M. or 15 R. P. S. With a direct drive the generator 31 rotates at 15 R. P. S., and with eight poles, shown in the illustration, it would generate a 60 cycle signal.

Assuming further that a 60 cycle standard frequency source is employed at 17. So long now as the two operate so that the motor 1 is rotating at 900 R. P. M., a 60 cycle signal is applied in the output of the amplifier 15.

As the motor 1 changes its speed slightly, the phase relation between the output signal of amplifier 15 and the standard frequency will shift redistributing the outputs in the phase detectors 21 and 22. This redistribution may be such that a decrease in the speed of the motor 1 increases the current flow in tube 21 and decreases the current flow in tube 22 to increase the potential across the load resistor.

This will produce a corresponding change in the potential applied over the conductor 7 to the grids of tubes 3 and 4. The change on the bias of the grid of tubes 3 and 4 will in turn change the firing point of these tubes, producing an increase in the current flowing to the motor 1 to increase its speed and bring it back to synchronous speed.

The motor 1 speed will thus be increased until the bias applied over conductor 7 again brings the circuit operation back to normal.

Conversely should the motor 1 increase its speed, the phase of the output signal of amplifier 15 will be ahead of the standard frequency resulting in a decrease in the output of phase detector 21 and increase in the phase detector 22.

This will in turn vary the bias on the grids of tubes 3 and 4 in the opposite direction from that described above, and these tubes will be fired so as to automatically decrease the current flow in the motor 1.

Thus the firing of the tubes 3 and 4, which in turn determines the amount of current supplied to the motor 1, is controlled by the grid potential applied to these tubes over the conductor 7. An increase in the bias applied to these tubes will produce firing near the beginning of the cycle and thus increase the output of the tubes to in turn increase the motor speed. A decrease in the bias potential will result in firing of the tubes at a later portion of the cycle, resulting in a decrease in the current supplied to the motor 1 to correspondingly decrease its speed.

In this operation it will be noted that the tubes 21 and 22 function primarily as switches providing a closing circuit intermittently for the output of amplifier 15 through the load resistors 11 and 12, the switch operation being in accordance with a standard frequency. In the above, the operations described have been those obtained as the motor 1 fluctuated in synchronous speed. Any well known means may be employed for bringing the motor up to approximate normal speed.

In order to further illustrate this operation I have shown in Figure 2 just that portion of Figure 1 which includes the phase detector, with arrows indicating the relative voltages applied in any one instant.

In this diagram, $E_{21}$ is the voltage applied between point 51 and the plate of the diode 21. $E_{22}$ is the voltage applied between 51 and the plate of diode 22.

In vector diagram, Figure 3, I have illustrated the condition for a 90° phase displacement between $E_1$ and $E$. In vector diagram, Figure 4, I have illustrated the voltage conditions for 45° displacement between $E_1$ and $E$. In Figure 5 the conditions for 45° displacement between $E_2$ and $E$. In Figure 3 with the 90° displacement, it will be noted that voltage $E_{21}$ equals $E_{22}$. With a 45° displacement between $E_1$ and $E$, voltage $E_{21}$ is greater than $E_{22}$ and with a 45° displacement between $E_2$ and $E$, $E_{21}$ is less than $E_{22}$.

If the time constant of the diode filters is large compared to the time for one cycle of the frequency used, the ripple is small and the voltages appearing between points 51 and 24, and 51 and 25, can be considered essential as a direct current voltage where a direct current voltage between 51 and 24 is equal to the peak magnitude of $E_{21}$, and the direct current voltage between 51 and 25 is equal to the peak magnitude of $E_{22}$.

Accordingly the differential direct current voltage appearing between 24 and 25 is equal to the difference between the peak magnitudes of $E_{21}$ and $E_{22}$, the polarity of this direct current voltage depending upon whether the angle of $E$ and $E_1$ is greater or less than 90°.

Figure 6 is a plot of the direct current differential output and the angle $\theta$ between $E_1$ and $E$. As will be noted from this curve, the balance point occurs when $\theta$ equals 90°.

In one form herein illustrated, a mixer tube 41 is provided with a grid electrode connected to the output of the tone generator 31 and a grid electrode connected to the standard frequency source 17. The output of the anode circuit of the mixer tube 41 is connected through a bandpass filter 42, the output of which is connected over the transformer 43 to a rectifier tube 44. With the motor 1 at rest, there is no voltage output from the generator 31 and accordingly no potential is applied to the electrode of the mixer tube 41. With this condition the mixer tube 41 is fed from the standard frequency source 17.

The bandpass filter has a cut-off frequency which may for purposes of illustration be 20 C. P. S. and as a cut-off at high frequency it may for purposes of illustration be $^7/_{10}$ of the standard frequency. Accordingly with the condition described above, no voltage is applied to the rectifier 44.

When the gas triodes 3 and 4 are ignited to supply driving power to the motor 1, two actions take place: When the motor has reached $^1/_3$ of the correct speed, the output frequency of the mixer 9 is within transmission range of the bandpass filter 42. The current flowing in the rectifier 44 through resistor 46 results in an increase in the bias on the grid of the vacuum tube 15.

As explained above, vacuum tube 15 is normally biased below cut-off due to the bias battery 35. The output of the rectifier 34 is a positive voltage which increases as the speed of generator 31 increases. The constants are proportioned so that with the motor running at a speed which produces a frequency within the band filtered by 42, the net result of the positive bias from the rectifier 34 and the negative bias from the rectifier 46 is to leave the net bias on the amplifier tube 15 below cut-off.

In this condition no voltage from generator 31 is fed to the phase detector 14 and accordingly its differential output voltage is zero, as explained in detail hereinabove. With zero output voltage in the phase detector, the bias on the gas triodes 3 and 4 is at the original value set by the bias battery 10 and the motor continues to accelerate.

The setting of the bias battery 10 is such as to produce a motor speed in the absence of control in the vicinity of the desired speed.

As the motor speed approaches the correct value, the output frequency of the filter 42 decreases, and at the point where the filter starts to attenuate, the output of the rectifier 44 decreases.

At the same time the output of the rectifier 34 is increased to normal voltage and the net result is to place a bias which is not as great as the cut-off on the vacuum tube 15 so that vacuum tube 15 now amplifies and applies the output frequency of the generator 31 to the phase detector. The speed of the motor at this time is slightly below the correct speed and is in the range where it can be pulled into step by the action of the phase detector on the gas triodes in the manner described above.

As will now be clear, the speed of the motor will be such that the frequency generated by tone generator 31 and the standard frequency are identical and the phase relation between the standard frequency and the generator 31 voltage are held within certain tolerances depending on the change of load on the motor and the control ratios throughout the circuit.

Thus, at any instant the rotational position of the armature of the motor is held within a portion of one cycle of the standard frequency voltage.

Although for purposes of illustration, I described a normal speed of motor 1 of 900 R. P. M., I may by the use of gearing or changes in the pole faces of motor 31, use any desired motor speed as for example 3600 R. P. M. so long as the output frequency of generator 31 is that of the standard frequency with which it is to be compared.

In the foregoing I have described my invention solely in connection with a specific illustrative embodiment thereof. Since many variations and modifications of my invention will now be obvious to those skilled in the art, I prefer to be bound not by the specific disclosures herein contained, but only by the appended claims.

I claim:

1. In a motor speed control system, a gas tube energized from a source of alternating current, circuit connections including and controlled by said tube for controlling the application of power supply to the motor whose speed is to be controlled, said gas tube having a control electrode for controlling the firing of said tube, means for generating a signal frequency in accordance with the speed of said motor, a source of standard frequency, and electronic means responsive to the phase relation of said signal frequency and said standard frequency for controlling the bias of said control electrode for controlling the firing of said gas tube to supply current power from said source to maintain said motor at synchronous speed.

2. In a motor speed control system, a gas tube energized from a source of alternating current, circuit connections including and controlled by said tube for controlling the application of power supply to the motor whose speed is to be controlled, said gas tube having a control electrode for controlling the firing of said tube, means for generating a signal frequency in accordance with the speed of said motor, a source of standard frequency, and electronic means comprising a phase detector responsive to the phase relation of said signal frequency and said standard frequency for controlling the bias of said control electrode for controlling the firing of said gas tube to supply current power from said source to maintain said motor at synchronous speed.

3. In a motor speed control system, a gas tube energized from a source of alternating current, circuit connections including and controlled by said tube for controlling the application of power for driving the motor whose speed is to be controlled, a standard frequency, said motor speed when at said predetermined speed having a predetermined relation to the signal frequency of said standard, a signal frequency generated by said generator, means for comparing said generated and standard frequency, and means for controlling the firing of said tube in accordace with the phase relation of said standard and generated frequencies comprising a rectifier tube, means controlled by said frequency standard for energizing said rectifier tube at said standard frequency, and means controlled by said generated frequency for controlling said gas tube operating during the energization of said rectifier tube in accordance with the fluctuations of said motor speed from normal.

4. In a speed control system for controlling the speed of a motor, a pair of gas triodes, each having a plate and energized push-pull from a source of alternating current, circuit connections including a biasing means for normally biasing the grids of said triodes to fire said triodes at a predetermined point to maintain the motor rotating at a predetermined speed, a phase detector for controlling the bias applied to the grids of said gas triodes, a source of standard frequency, a first amplifier, circuit connections from said standard frequency source to the input of said amplifier, a generator connected to said motor for generating a signal frequency in accordance with the speed of said motor, a second amplifier, circuit connections from said generator to said amplifier, circuit connections from the output of said second amplifier to the input of said phase detector for generating in the output of said phase detector a voltage in accordance with the phase differential existing between said first and second amplifiers, and circuit connections including the output of said phase detector and said bias circuits to the grids of said triodes.

5. In a speed control system for controlling the speed of a motor, a pair of gas triodes, each having a plate and energized push-pull from a source of alternating current, circuit connections including said source for biasing the grids of said gas triodes, said circuit connections including a condenser to shift the grid bias 90° out of phase with respect to the plate energization, said circuit connections including a D. C. bias to fire said triodes at a predetermined point to maintain the motor rotating at a predetermined speed, a phase detector for controlling the bias applied to the grids of said gas triodes, a source of standard frequency, a first amplifier, circuit connections from said standard frequency source to the input of said amplifier, a generator connected to said motor for generating a signal frequency in accordance with the speed of said motor, a second amplifier, circuit connections from said generator to said amplifier, circuit connections from the output of said second amplifier to the input of said phase detector for generating in the output of said phase detector a voltage in accordance with the phase differential existing between said first and second amplifiers, and circuit connections including the output of said phase detector and said bias circuits to the grids of said triodes.

6. In a speed control system for controlling the speed of a motor, a frequency generator connected to said motor and generating a signal frequency in accordance with the speed of said motor, a standard frequency, a pair of diodes, means including circuit connections from said source of standard frequency for alternately rendering said diodes conductive, means including circuit connections from said frequency generator to the plates of said diodes for varying the output of said diodes as they become conductive in accordance with the phase relation between the signal of said frequency generator and said standard frequency, a pair of gaseous discharge tubes, each having a cathode, grid and anode, means including circuit connections from the output of said diodes to the grids of said gaseous discharge tubes for controlling the period of discharge of said tubes, and means including circuit connections from the output circuit of said gaseous discharge tubes to the motor whose speed is being controlled for driving said motor.

7. In a speed control system for controlling the speed of a motor, a frequency generator connected to said motor and generating a signal frequency in accordance with the speed of said motor, a standard frequency, a pair of diodes, a first amplifier tube, circuit connections including said amplifier tube from said source of standard frequency to the input of said diodes for alternately rendering said diodes conductive, a second amplifier tube, circuit connections including said second amplifier tube from said frequency generator to the plates of said diodes for varying the output of said diodes as they become conductive in accordance with the phase relation between the signal of said frequency generator and said standard frequency, a pair of gaseous discharge tubes, each having a cathode, grid and anode, means including the output circuits of said diodes to the grids of said gaseous discharge tubes for controlling the period of discharge of said tubes, and means including circuit connections from the output circuit of said gaseous discharge tubes to the motor whose speed is being controlled for driving said motor.

8. In a speed control system for controlling the speed of a motor, a frequency generator connected to said motor and generating a signal frequency in accordance with the speed of said motor, a standard frequency, a pair of diodes, a first amplifier tube, circuit connections including said amplifier tube from said source of standard frequency to the input of said diodes for alternately rendering said diodes conductive, a second amplifier tube, circuit connections including said second amplifier tube from said frequency generator to the plates of said diodes for varying the output of said diodes as they become conductive in accordance with the phase relation between the signal of said frequency generator and said standard frequency, a pair of gaseous discharge tubes, each having a cathode, grid and anode, means including the output circuits of said diodes to the grids of said gaseous discharge tubes for controlling the period of discharge of said tubes, means including circuit connections from the output circuit of said gaseous discharge tubes to the motor whose speed is being controlled for driving said motor, and means for normally biasing said second amplifier tube below cut-off, and circuit connections including means responsive to a speed of said motor for controlling said last mentioned biasing means to place a bias which is not as great as the cut-off in said second amplifier tube when said motor speed approximates normal speed.

PHILIP E. VOLZ.

REFERENCES CITED

The following references are of record in the file of this patent:

UNITED STATES PATENTS

| Number | Name | Date |
|---|---|---|
| 2,050,624 | Morton | Aug. 11, 1936 |
| 2,417,868 | Glass | Mar. 25, 1947 |